United States Patent [19]
Kawaguchi et al.

[11] Patent Number: 5,478,639
[45] Date of Patent: Dec. 26, 1995

[54] ADHESIVE TAPE FOR PREVENTING IMPLOSION OF CATHODE RAY TUBE

[75] Inventors: Takeo Kawaguchi; Osamu Shiono; Minoru Yoshida, all of Tokyo, Japan

[73] Assignee: Teraoka Seisakusho Co., Ltd., Tokyo, Japan

[21] Appl. No.: 325,627

[22] Filed: Oct. 19, 1994

Related U.S. Application Data

[63] Continuation of Ser. No. 110,943, Aug. 24, 1993, abandoned.

[30] Foreign Application Priority Data

May 12, 1993 [JP] Japan .................. 5-132422
May 12, 1993 [JP] Japan .................. 5-132423

[51] Int. Cl.⁶ ........................................ C09J 7/02
[52] U.S. Cl. ............................ 428/261; 428/354
[58] Field of Search ..................... 428/354, 261, 428/259

[56] References Cited

U.S. PATENT DOCUMENTS

| | | | |
|---|---|---|---|
| 4,282,011 | 8/1981 | Terpay | 428/259 |
| 5,246,771 | 9/1993 | Kawaguchi | 428/354 |

FOREIGN PATENT DOCUMENTS

| | | | |
|---|---|---|---|
| 40-22338 | 10/1965 | Japan . | |
| 53-18946 | 2/1978 | Japan . | |
| 56-34984 | 8/1981 | Japan . | |
| 57-46622 | 10/1982 | Japan . | |
| 0215088 | 10/1985 | Japan | 428/354 |
| 63-24291 | 5/1988 | Japan . | |

*Primary Examiner*—Jenna L. Davis
*Attorney, Agent, or Firm*—Burns, Doane, Swecker & Mathis

[57] ABSTRACT

An adhesive tape for preventing implosion of a CRT is provided. The tape includes a backing, a pressure sensitive adhesive layer on one side of the backing and a hot melt adhesive layer on the opposite side of the backing. The backing is a union cloth of natural or synthetic fiber yarns as the warps and glass filament yarns as at least part of the wefts.

9 Claims, 6 Drawing Sheets

ADHESIVE TAPE FOR PREVENTING IMPLOSION OF CATHODE RAY TUBE

This application is a continuation of application No. 08/110,943, filed Aug. 24, 1993, now abandoned.

BACKGROUND OF THE INVENTION

1. Field of the Invention

The present invention relates to an adhesive tape for preventing an implosion of a cathode ray tube (hereinafter referred to as "CRT").

2. Description of Related Art

CRTs used in television and other equipment may implode with a minor shock due to the high vacuum inside the tubes. The CRTs can be made resistant to implosion by firmly compressing an outer portion of a CRT by a metal band. However, the metal band is in direct contact with the glass of the CRT and may damage the surface of the glass due to a difference in hardness between the metal and the glass and due to protrusions formed at the welded portions of the metal band. The damage may cause a local reduction in the strength of the CRT. Moreover, the metal band may slip on the curved surface of the CRT and will not hold the CRT at an appropriate position to obtain an effective clamping or supporting effect.

An adhesive layer, including a backing, is inserted between the metal band and the CRT to avoid the above-mentioned disadvantages derived from the direct contact of a metal band with the glass of a CRT. This adhesive tape prevents cracks forming if a metal band is placed in direct contact with the CRT glass. The adhesive tape can also hold fragments of glass and minimizing the dispersion of the fragments of glass, if the CRT glass is broken.

Conventionally, such an adhesive layer containing a backing is, for example, a double-sided adhesive tape, an epoxy prepreg (see JP-B-40-22338) and so forth. Recently, an adhesive tape containing a glass cloth as the substrate is widely used (see JP-B-63-24291).

Nevertheless, the adhesive tape containing a glass cloth has the following disadvantages; when taping is completed and the tape is cut, a special cutting tool is necessary to cut the glass filament yarns. Since the glass filament yarns are brittle, when taping is carried out and the tape is bent, the glass filament yarns may be broken or their strength reduced, resulting in difficulty in taping or forming a continuous adhesive layer on the CRT glass. The conformity of the tape to the shape of a CRT is poor due to stiffness of the glass cloth backing tape, so that the tape interfere with the clamping of the metal band. A surface treatment of the glass filament yarns is necessary to coat and maintain an adhesive on a glass cloth backing. This treatment is expensive (i.e., it requires silane coupling agents) and is complex.

Furthermore, adhesive tapes are formed by slitting a glass cloth backing with coated adhesive layers thereon in the direction of the warps. By this slitting, glass filament yarn or yarns at the sides of the slit tape are broken and protrude irregularly (edge fluffs). When the tape is wound around a CRT, the irregularly protruded broken glass filaments or edge fluff lower the aesthetic appearance. Due to light passing through the glass filament yarn wefts, the tape looks bright or white and, further, such light may even disturb the display image on the CRT. In order to avoid these defects, the sides of the tapes are painted black to keep the light from the glass filament yarn wefts. This is disadvantageous in practice.

The present invention solves the above problems of the prior art.

SUMMARY OF THE INVENTION

The above and other objects are attained by providing an adhesive tape for preventing an implosion, comprising a backing having first and second main surfaces, a pressure sensitive adhesive layer disposed on said first main surface of the backing and a hot melt adhesive layer disposed on said second main surface of the backing, said backing being a union cloth comprising natural or synthetic fiber yarns as the warps and, as the wefts glass filament yarns alone or a combination of glass filament yarns with natural or synthetic fiber yarns, one to about 30 yarns of said natural or synthetic fiber yarns being arranged between each adjacent glass filament yarns when said glass filament yarns and natural or synthetic fiber yarns are combined in the wefts, said adhesive tape having a transverse direction compression rupture strength of at least 5 kgf/cm at a step having a height of 0.5 mm.

In a preferred embodiment, the warps are selected from black colored natural or synthetic fiber yarns so that the adhesive tape looks black when viewed from the side.

In another aspect of the present invention, there is also provided a process for reinforcing a cathode ray tube to prevent an implosion thereof, said process comprising:

preparing a cathode ray tube having a maximum peripheral portion and covered with a transparent electrically conductive film;

winding the adhesive tape according to the present invention completely or partly on or near the portion of the maximum peripheral portion of the cathode ray tube; and clamping the cathode ray tube with a metal clamping band around the maximum peripheral portion of the tube and on top of the adhesive tape, by heating the metal clamping band to a temperature of not less than 60° C. and placing the metal clamping band around the adhesion tape and cooling the metal clamping band to fix the adhesive tape to said portion of the tube by the metal clamping band.

DESCRIPTION OF THE PREFERRED EMBODIMENTS

Figure 1:
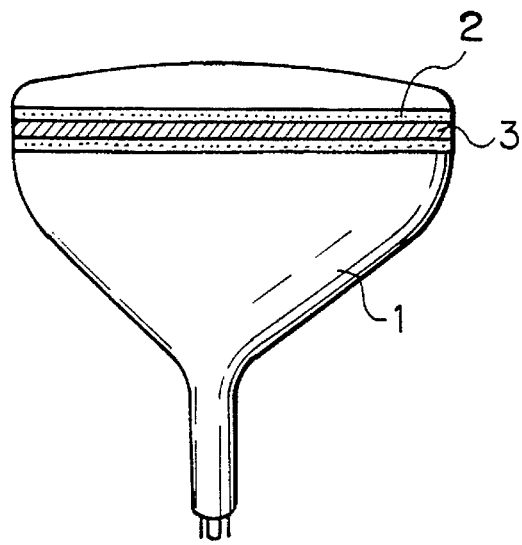
FIG. 1 is a plan view of a CRT on which a metal band is clamped.
Figure 2:
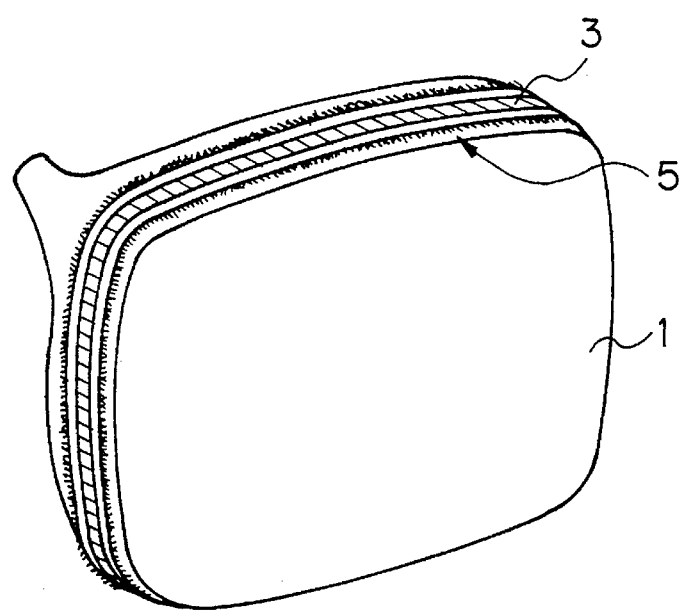
FIG. 2 is a perspective view of a CRT on which a metal band is clamped.
Figure 3:
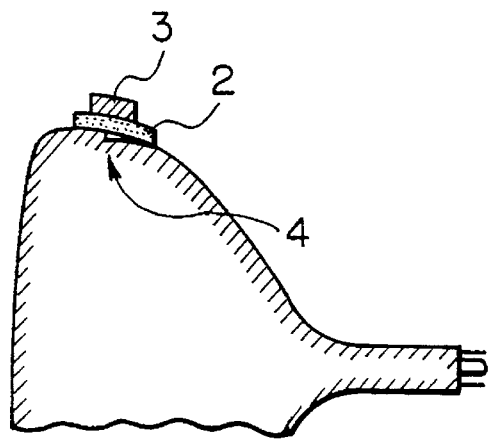
FIG. 3 is a sectional view of a part of a CRT with a metal band.

FIGS. 1 and 2 show a CRT reinforced with a metal band. In the figures, 1 denotes a CRT, 2 an adhesive tape for implosion prevention, and 3 a metal band. The adhesive tape 2 and metal band 3 are wound around the maximum outer size portion of the CRT 1. As shown in FIG. 3, near the maximum outer size portion of the CRT 1, there is a mold matching line step 4. The step 4 is at most 0.5 mm high.

Figure 4:
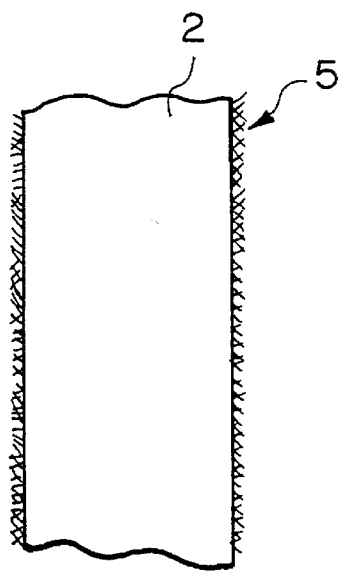
FIG. 4 is a plan view of an adhesive tape for implosion prevention.

Since the adhesive tape is prepared by coating adhesives on a backing followed by slitting into a predetermined width for automatic taping (e.g., 45 mm wide) and winding on a core roll (e.g., 300 m long). When the tape is slit, the warps along the peripheries of the tape are cut or broken and the broken fibers 5 stand or extrude like fluff (FIGS. 2 and 4).

Figure 5:
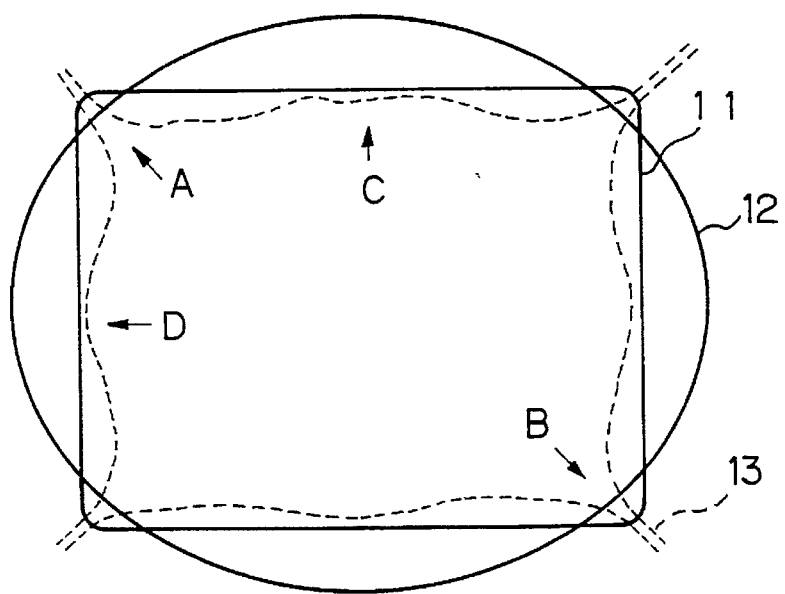
FIG. 5 shows a pressure distribution around a CRT clamped with a metal band.

As described before, if the backing of the adhesive tape is made of a glass cloth, (1) it is difficult to cut without a special cutting means during the taping operation. This is very disadvantageous in handling or productivity. (2) Since the glass cloth does not have a sufficient flexibility to conform to a tape roll core or a curved surface of a CRT, the glass filament yarns may be broken at various places, such as the corners of the CRT, when wound up on the core or when compressed on a CRT by the metal band. This significantly lowers the mechanical strength of the adhesive tape and its reinforcing effects. FIG. 5 illustrates an example of the pressure distribution on a CRT when it is clamped with a metal band. The line 11 shows the outer periphery of the CRT, the line 12 shows a pattern of a metal band, and the broken line 13 shows a pattern of the clamping pressure distribution. As seen in FIG. 5, the clamping pressure is maximum at the corners A and B of the CRT, and relatively high at middle of long side C and short side D of the CRT. Furthermore, since the adhesive tape does not conform with the shape of the CRT, the metal band to be set over the adhesive tape may be caught by the extruding portions of the adhesive tape and defects may be formed thereby.

(3) The glass cloth backing necessitates a fiber surface treatment agent which is expensive and complex to process.

(4) Furthermore, the standing or protruding broken glass filaments of the glass filament yarns along the periphery of the tape looks white and lowers the aesthetic appearance. Light may leak through the glass filament yarn wefts of the tape and the edge of the tape. The leaked light may cause a fuzzy image near the peripheral portion of the display surface of the CRT. In the prior art, therefore, painting the side peripheries of the adhesive tape black is required, which is disadvantageous.

The present invention solves the above problems by using a backing (of a union cloth or a mixed fabric) comprising natural or synthetic fiber yarns as the warps and glass filament yarns, optionally with natural or synthetic fiber yarns, as the wefts. The warps are preferably made of black colored natural or synthetic fiber yarns. Further, a pressure sensitive adhesive layer is provided on one side (main surface) of the backing and a hot press adhesive layer is provided on the other side (main surface) of the backing.

Figure 6:
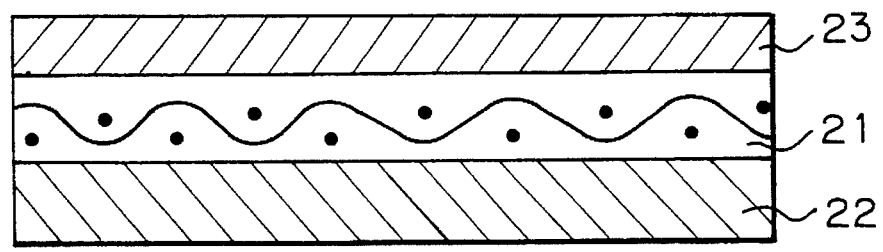
FIG. 6 is a sectional view of an adhesive tape for implosion prevention.

FIG. 6 shows a cross sectional view of the adhesive tape for implosion prevention, in which 21 denotes a backing of a cloth union, 22 a pressure sensitive adhesive layer, and 23 a hot melt adhesive layer.

Figure 7:
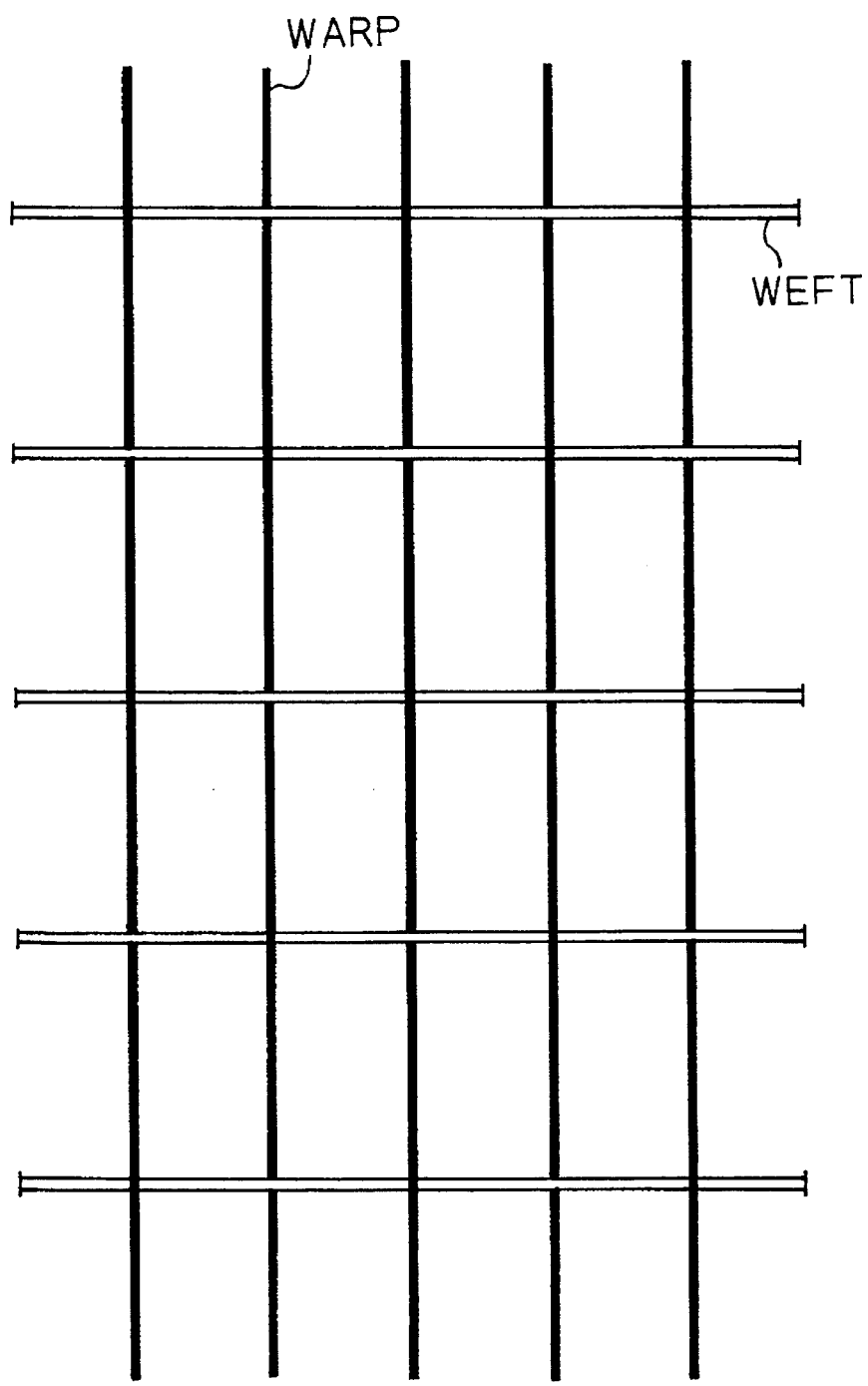
FIGS. 7 to 9 show weaves of cloth union used in the adhesive tapes of the present invention.
Figure 8:
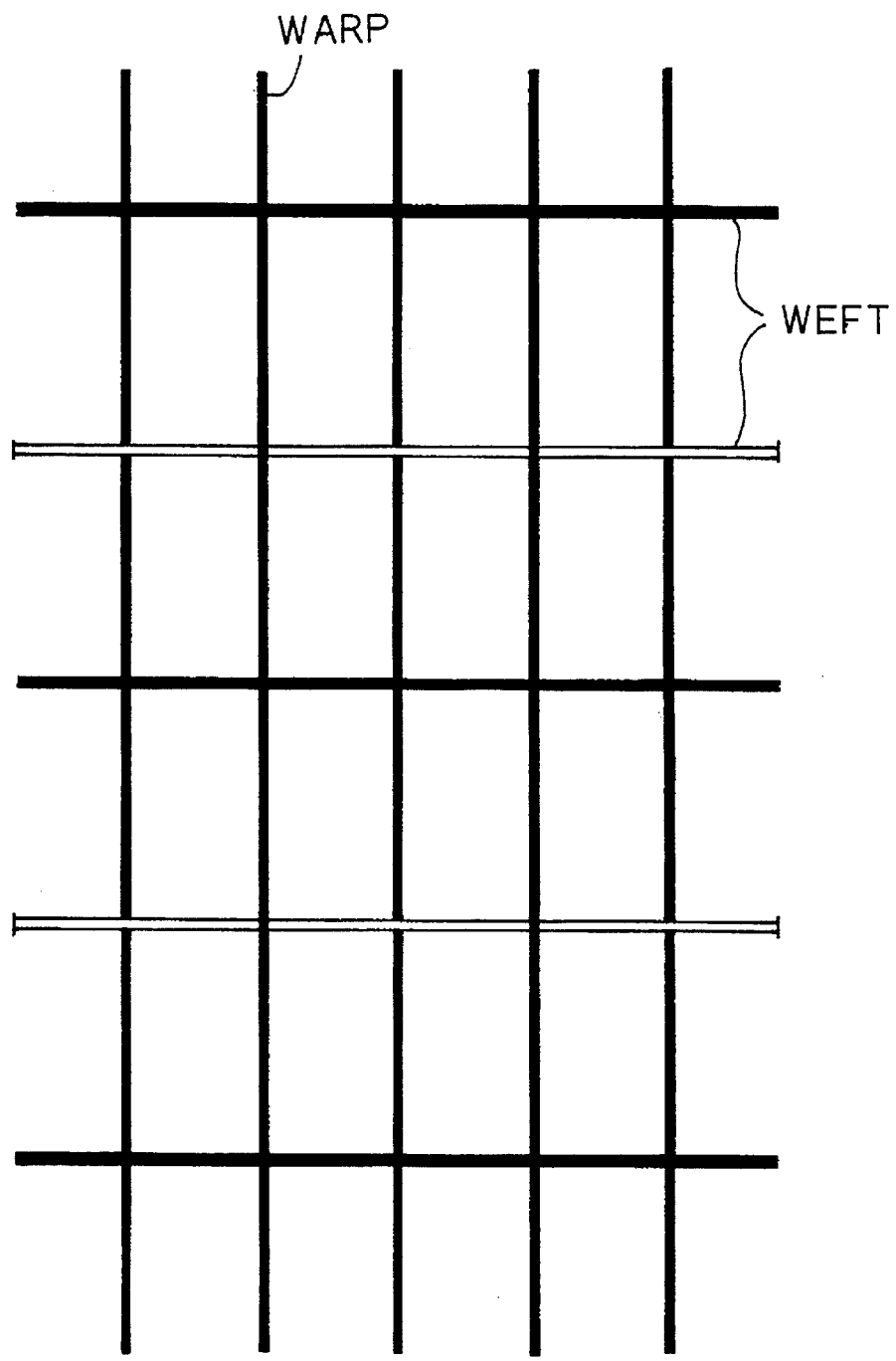
Figure 9:
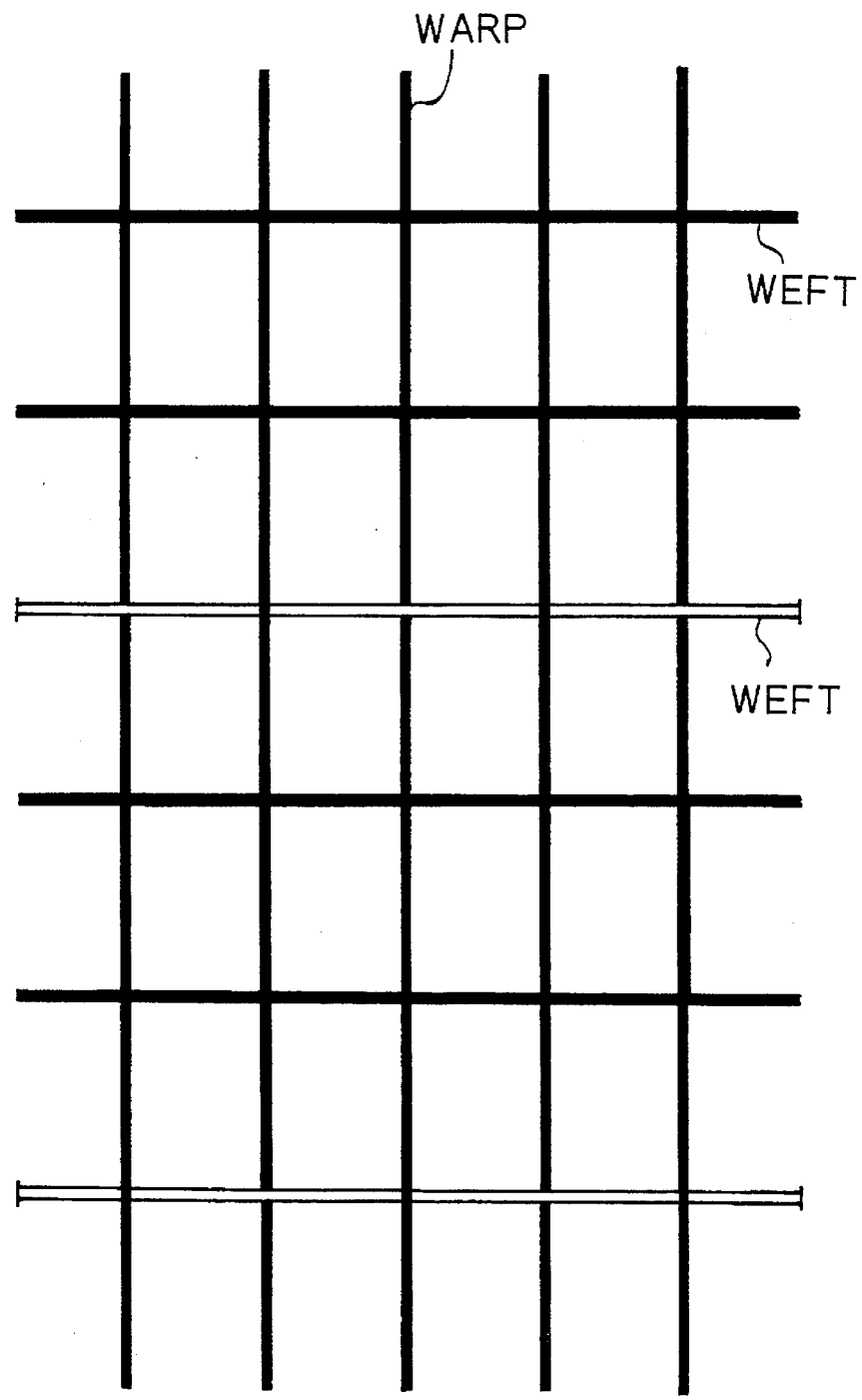

FIGS. 7 to 9 show examples of the union cloth of the present invention.

In all cases of the present invention, the warps are made of natural or synthetic fiber yarns, preferably colored black.

The wefts may consist of glass filament yarns (FIG. 7), or may consist of a combination of alternately arranged glass filament yarns and natural or synthetic fiber yarns (FIG. 8), or a combination of glass filament yarns and natural or synthetic fiber yarns arranged in such a manner that two or more natural or synthetic fiber yarns are inserted between each adjacent glass filaments yarns (FIG. 9). In FIGS. 7 to 9, the black yarns are natural or synthetic fiber yarns and the white yarns are glass filament yarns. The vertical yarns are the warps and the horizontal yarns are wefts.

The glass filament yarns in the tape preferably have a fineness of 25 d to 500 d, more preferably 50 d to 200 d.

The natural or synthetic fiber yarns in the tape may be any commercially available yarns, including yarns of cotton fibers, rayon fibers, acrylic fibers, polyester fibers, etc. When the yarns are intended to be black in color, the fibers may be originally colored or the yarns may be dyed.

The natural or synthetic fiber yarns preferably have a yarn counting of 10 S to 40 S, more preferably 20 S to 30 S. Here, S (tex) stands for gram weight per one-hundred meter length.

The weave of the union cloth is not particularly limited but may simply be a plain weave. The union cloth preferably has a density of 10 to 50 yarns per 25 mm for both the warps and wefts.

It is preferred that the wefts contain natural or synthetic fiber yarns in addition to glass filament yarns so that the adhesive tape can have more flexibility. In the wefts, one to about 30 natural or synthetic fiber yarns may be generally combined with one glass filament yarn. Preferably, the glass fiber yarns and natural or synthetic fiber yarns used have substantially the same diameter or fineness to form a uniform backing. More preferably, the glass filament yarns are used with at most three natural or synthetic fiber yarns inserted between adjacent glass filament yarns, so as to obtain a sufficient compression rupture strength. Still more preferably, the natural or synthetic fiber yarns and glass filament yarns are used to share the same wide with each other, in order words, in the same number of yarns. For example six natural or synthetic fiber yarns and six glass filament yarns per 25 mm are used.

The glass filament yarns used as the warps and the glass filament yarns used in the wefts may be identical for convenience.

The union cloth or mixed fabric has a diameter of generally 0.05 mm or more, preferably 0.1 mm or more. If the warps are too thin, the tape strength is insufficient for taping. If the wefts are too thin, the compression rupture strength of the tape is insufficient. If the thickness is too Large, the gap between the CRT glass and a metal band becomes large so that the inside length of the metal band must vary, or light leakage through the glass filament yarns is increased in spite of the effect of the black warps.

Referring to FIG. 3, a CRT glass has a step 4 on the mold matching line formed near the maximum outer size of the CRT and an adhesive tape 2 must be resistant to a compression rupture stress encountered at said step. Usually, the step has a height of at most 0.5 mm and the tape should have a transverse compression rupture strength of 5 kg/cm or more at the step having a height of 0.5 mm. In this specification, the transverse compression rupture strength of an adhesive tape is measured as below: A steel wire having a diameter of 0.5 mm is adhered onto a pressure sensitive adhesive layer of an adhesive tape in the direction of warps, a pressure of 20 kgf/cm is applied onto the adhesive tape and the wire, and the tensile strength of the adhesive 10 tape in the direction of the wefts is then measured (in units of kgf/cm). This measured tensile strength is defined as the transverse compression rupture strength of an adhesive tape at a 0.5 mm step.

The transverse compression rupture strength of an adhesive tape must be provided by the union cloth backing. In other words, the backing must have a transverse compression rupture strength of 5 kg/cm or more at a 0.5 mm step. If the adhesive tape or backing has this strength (5 kg/cm or more), it is sufficient for the purpose.

The inventors found that by using natural or synthetic fiber yarns as the warps in combination of glass filament yarns as the wefts, the adhesive tape containing such a backing can be easily cut without a special cutting means during taping, and that breakage or strength reduction of the tape does not occur during unwinding. They also found that the conformity of the tape to a curved surface of a CRT glass is excellent, and that a yarn surface treatment, such as that using a silane coupling agent, need not be used.

Further, the inventors surprisingly found that by using black natural or synthetic fiber yarns only as the warps in combination of glass filament yarns as the wefts, the light leakage effect of the glass filament yarn wefts disappears and that painting the side peripheries of the adhesive tape with a black paint is not needed.

The adhesive tape of the present invention comprises a pressure sensitive adhesive layer on one main surface of the backing. The pressure sensitive adhesive layer has a good adhesion to the CRT glass and the backing. The pressure sensitive adhesive layer also has a high cohesion which resists the shear force between the CRT glass and the metal band when a shock is applied to the CRT and against a peeling force which appears when the CRT glass is broken. The material of the pressure sensitive layer is not particularly limited as long as it has the above described functions. Typical examples are an acrylic system adhesive containing acrylate as a main component, a rubber system adhesive containing a natural or synthetic rubber and an adhesive resin, and so forth. The pressure sensitive adhesive layer may further contain additives such as electrically conductive particles, fillers, softeners and antioxidants.

The pressure sensitive adhesive layer is applied on a backing in an amount of generally 30 to 300 g/m$^2$, preferably 50 to 200 g/m$^2$. If the amount of the adhesive is low, the adhesive force of the tape is low. If the amount of the adhesive is high, a clamping band may tend to slip during clamping.

The adhesive tape of the present invention comprises a hot melt adhesive layer on the other main surface of the backing. The hot melt adhesive layer has a releasing effect with respect to the pressure sensitive adhesive layer, but has a good adhesion to the backing and the metal band. When a heated metal band is put in contact with the hot melt adhesive layer of the tape, the contacting portion thereof is melted and adheres the metal band with the tape.

The material of the hot melt adhesive layer (also called a "thermoplastic adhesive layer" or "heat active adhesive layer") is one that is film forming, is soft at room temperature, has a melting point of 60° to 200° C., and has a high adhesion to metals. For example, resins of polyethylene, polyester, acryl grafted polyethylene, ethylene-vinyl acetate copolymer, stylene-butadiene copolymer, ethylene acrylic copolymer, polyamide, and so on can be used as a single component or the main component of a composition with other components such as a tackifier and additives.

If the hot melt adhesive layer does not have a releasing effect with respect to the pressure sensitive adhesive layer, an additional releasing layer may be coated on the surface of the hot melt adhesive layer.

The amount of the hot melt adhesive layer is generally 10 to 100 g/m$^2$, preferably 30 to 70 g/m$^2$. If the amount of the adhesive layer is low, the adhesive force is insufficient. If the amount of the adhesive layer is high, the metal band tends to slip during clamping.

The hot melt adhesive layer is conveniently first coated on a backing by extruding a molten adhesive composition at 250° C. to 450° C. in the form of a film on the backing. If the adhesive composition cannot be extruded, it may be dissolved in a solvent and the solution be coated or impregnated to the backing by a roll coater or dip coater. Alternatively, a film of an adhesive composition may be formed and then transferred onto the backing.

The pressure sensitive adhesive layer may be coated on the other main surface of the backing by a roll coater or gravure coater if the adhesive composition requires a solvent, or by an extruder or calender if the adhesive composition does not require a solvent. If the pressure sensitive adhesive layer can be extruded, both the pressure sensitive adhesive layer and hot melt adhesive layer can be extruded simultaneously onto a backing.

The thus produced adhesive tape is slit into a predetermined width so that automatic taping can be performed.

In the adhesive tape of the present invention, since the releasing property of the pressure sensitive adhesive layer from the hot melt adhesive layer is excellent, a separator is not necessary. As a result, a taping machine for applying the tape to the CRT glass may be a simple one. Furthermore, since the backing of this adhesive tape is resistant to bending, a high-speed taping operation is possible.

After the adhesive tape is applied onto the CRT glass, a metal band is banded over the adhesive tape onto the CRT. The metal band may be banded by heating the band to expand it to such a degree of more than the yielding point of the metal, setting over the adhesive tape and then cooling the band so that the metal band is thermally shrinked to band the CRT. The heating may be electrical or by flame. The temperature is 60° C. or higher. The heating may be assisted by stretching to obtain a necessary expansion of the metal band.

Alternatively, a metal band may be mechanically clamped over the adhesive tape onto the CRT glass.

During the clamping of a metal band, the adhesive tape of the present invention has sufficient compression rupture strength so that the adhesive tape is not broken or cut by the clamping and thus allows an excellent reinforcing effect of the metal band.

As described before, the adhesive tape of the present invention is excellent in conformity with the curved shape and can be conformed even with a flat-shape or large-size CRT, and the adhesive tape can be easily cut without a special cutting means during taping. Furthermore, the hot melt adhesive may flow over the glass surface of a CRT by the heat and pressure during the banding and the flown hot melt adhesive has a function of stopping the permanent flowability of the (hot melt) adhesive so that the adhesion between the metal band and CRT is improved as well as a function of increasing the adhesion between the tape and CRT so that the reinforcing effect is improved. Moreover, the exposed hot melt adhesive layer that is not in contact with the metal band does not collect dust, etc., and maintains a clean appearance.

Even if some defects of a CRT are found after banding and the CRT is to be recycled, only the metal band is cut and the adhesive tape can be easily peeled off at an angle of 180° while no adhesive remains on the surface of the CRT. Thus, the production loss is minimized.

EXAMPLES

Example 1

A backing used was a union cloth of a plain weave comprising warps of colorless spun rayon yarns (yarn counting of RNS 20S) at a density of 16 yarns per 25 mm and wefts of glass filament yarns (thickness of 75 d) at a density of 16 yarns per 25 mm.

On a main surface of the backing, a polyethylene (with a melting point of 93° C.) was extruded as a hot melt adhesive layer at a rate of 38 g/m$^2$ from an extruder. On the other main surface of the backing, an acrylic system pressure sensitive adhesive comprising 95% of buthylacrylate, 5% of acrylic acid and minor amounts of a curing agent and an antioxidant was applied in an amount of 75 g/m$^2$ by a calender. Thus, an adhesive tape for implosion prevention having a total thickness of 0.32 mm was prepared.

A steel wire with a diameter of 0.5 mm was applied to the surface of the pressure sensitive adhesive layer of the adhesive tape in the direction of the warps of the backing. A pressure of 20 kgf/cm was applied to the assembly of the adhesive tape and steel wire by an air press over a table. The adhesive tape was then expanded in the direction of the wefts so that the tensile strength of the adhesive tape in the transverse direction was measured. This tensile strength was considered to be the transverse compression rupture strength of the adhesive tape at a step with a height of 0.5 mm. The transverse compression rupture strength of the adhesive tape was 12.5 kgf/cm.

The peeling resistance of the pressure sensitive adhesive layer of the adhesive tape adhered to a glass plate and the peeling resistance of the hot melt adhesive layer of the adhesive tape adhered to a steel plate were measured by first applying a pressure of 10 kg/cm$^2$ at 300° C. for 5 seconds to the adhesive tape and the glass or steel plate followed by measuring the peeling resistance of the adhesive tape with a constant speed tension type tensile strength tester. The results were 700 gf/cm and 850 gf/cm, respectively.

The shearing adhesive force of the pressure sensitive layer of the adhesive tape in relation to a glass plate and the shearing adhesive force of the hot melt adhesive layer of the adhesive tape in relation to a steel plate were also measured by first forming samples in the same manner as for the peeling resistance measurement. The results were 15.6 kgf/m$^2$ and 13.4 gf/cm$^2$, respectively.

The adhesive tape was slit to a width of 45 mm and wound up. The length of the tape was 300 m. When the side of the adhesive tape was viewed, the color was dark gray.

The adhesive tape was wound over the mold matching line step (maximum step of 0.45 mm) of a CRT for 29 inch color TV set. A metal band having an inner length that was 96% of the outer length of the CRT was heated to about 450° C., mounted over the adhesive tape, and rapidly cooled to clamp the CRT. Samples were made in a suitable number and used for the following application tests.

The metal band and the adhesive tape of one of the samples was cut and the adhesive tape was carefully peeled off the CRT. The peeled adhesive tape was inspected particularly at portions corresponding to the long sides, corners and short sides of the CRT. The backing did not have a cut at any position.

One of the samples was subjected to ten heat cycles, one heat cycle comprising −45° C. for 5 hours and +80° C. for 5 hours. After the heat cycles the adhesive tape was examined but no displacement was observed.

One of the samples was held with the front surface of the CRT upward in an atmosphere at 70° C. by clamping the metal band. A weight of 120 kg was placed on the front surface of the CRT and kept there for 30 minutes. After this accelerated displacement test, the displacement of the adhesive tape was determined to be 1.0 mm.

With one of the samples being fixed with the front surface of the CRT upward, a steel ball with a weight of 5 pounds was dropped from a height of 5 feet. The number of cracks passing through the CRT glass under the metal band was six.

One of the samples was dropped from a height of 1.5 mm with the front surface of the CRT downward so that the CRT was broken. The glass capturing rate of the clamping band after the CRT glass was broken was determined to be 93%. The glass capturing rate was determined by eye by determining the area of the clamping band where glass was adhered.

The results are summaried in the Tables.

Example 2

A backing was made from a union cloth of plain weave comprising warps of black colored spun rayon yarns (yarn counting of RNS 20S) at 16 yarns/25 mm and wefts of glass filament yarns (thickness of 75 d) at 16 yarns/25 mm.

On a main surface of the backing, a polyethylene hot melt adhesive (a melting point of 93° C.) was extruded at a rate of 35 g/m$^2$. On the other side of the backing, a rubber-system pressure sensitive adhesive comprising 33 wt % of natural rubber, 26 wt % of a paraffine resin as a tackifier, 33 wt % of calcium carbonate as a filler, 7 wt % of oil as a softener and 1 wt % of an antioxidant was coated in an amount of 75 g/m$^2$ by a calender. Thus, an adhesive tape for implosion prevention with a thickness of 0.32 mm was prepared.

The tests of the characteristics of the adhesive tape and the application tests of the adhesive tape were performed in the same manner as described in Example 1.

The results are shown in the Tables.

Incidentally, when the adhesive tape slitting and winding was observed, the side of the adhesive tape was black and, even if the adhesive tape was observed with a back light, light did not pass through the wefts of the glass filament yarns.

A sample of a CRT reinforced with the adhesive tape and metal band was set in a TV cabinet and placed in a black room. In the black room, the CRT was irradiated from the rear side thereof with a 50 W incandescent lamp and the CRT was observed from the front side thereof by eye. As a result, no white portions were seen and fussy image near the periphery of the CRT was not seen.

Examples 3 and 4

The procedures of Examples 1 and 2 were repeated. The adhesive tapes for implosion prevention were prepared using a union cloth comprising black spun rayon yarns as the warps and glass filament yarns (Example 3) or a combination of glass filament yarns and black spun rayon yarns (Example 4).

The characteristics tests and application tests of the adhesive tapes were performed as described in Examples 1 and 2.

The results are shown in the Tables.

Comparative Examples 1 and 2

The procedures of Examples 1 and 2 were repeated. The adhesive tapes for implosion prevention were prepared using glass cloths as the backing.

The characteristics tests and application tests of the adhesive tapes were performed as described in Examples 1 and 2.

The results are shown in Tables.

Comparative Example 3

The procedures of Examples 1 and 2 were repeated. The adhesive tapes for implosion prevention were prepared using a plain weave of warps and wefts of colorless spun rayon yarns.

The characteristics tests and application tests of the adhesive tapes were performed as described in Examples 1 and 2.

The results are shown in Tables.

TABLE 1

| | Structure and preparation of adhesive tape | | | | | | |
|---|---|---|---|---|---|---|---|
| | Example 1 | Example 2 | Example 3 | Example 4 | Comparative example 1 | Comparative example 2 | Comparative example 3 |
| Structure of tape | | | | | | | |
| Material of adhesive | Polyethylene | Polyethylene | Ethylene-vinyl acetate copolymer | Ethylene-acryl copolymer | Ethylene-vinyl acetate copolymer | Ethylene-acryl copolymer | Polyethylene |
| Coating amount (g/m$^2$) | 37 | 38 | 34 | 45 | 40 | 36 | 36 |
| Melting point (°C.) | 90 | 93 | 85 | 75 | 82 | 68 | 95 |
| Material of adhesive | Acrylic-system | Rubber-system | Rubber-system | Acrylic-system | Rubber-system | Rubber-system | Rubber-system |
| Coating amount (g/cm$^2$) | 43 | 75 | 72 | 45 | 81 | 54 | 77 |
| backing | | | | | | | |
| Material of warp | Colorless spun rayon yarn | Black spun rayon yarn | Black spun rayon yarn | Black spun rayon yarn | Glass yarn | Glass yarn | Colorless spun rayon yarn |
| Thickness | RYN20S | RYN20S | RYN20S | RYN30S | 150d | 150d | RYN30S |
| Density (/25 mm) | 16 | 16 | 13 | 30 | 35 | 13 | 50 |
| Material of weft | Glass yarn | Glass yarn | Black spun rayon yarn + Glass yarn | Glass yarn | Glass yarn | Glass yarn | Colorless spun rayon yarn |
| Thickness | 75d | 75d | RYN20S + 75d | 75d | 200d | 75d | RYN30S |
| Density (/25 mm) | 16 | 16 | 6.5 + 6.5 | 25 | 35 | 9 | 40 |
| Preparation method | | | | | | | |
| Coating method of adhesive | Emulsion surface treatment plus lamination | Emulsion surface treatment plus lamination | Emulsion surface treatment plus lamination | Emulsion surface treatment plus lamination | Solution surface treatment plus lamination | Solution surface treatment plus lamination | Emulsion surface treatment plus lamination |
| Coating machine for adhesive | Roll coater | Calender | Calender | Roll coater | Calender | Roll coater | Calender |

TABLE 2

| | Characteristics of adhesive tape | | | | | | |
|---|---|---|---|---|---|---|---|
| | Example 1 | Example 2 | Example 3 | Example 4 | Comparative example 1 | Comparative example 2 | Comparative example 3 |
| Thickness of tape (mm) | 0.30 | 0.31 | 0.32 | 0.25 | 0.27 | 0.25 | 0.32 |
| Appearance of cross section of tape[1] | Dark gray | Black | Black | Black | White section | White section | White section |
| Compression rupture strength[2] (kgf/cm) | 12.5 | 10.0 | 6.2 | 15.5 | 1.2 | 3.5 | 3.4 |
| Adhesive force to SUS plate | | | | | | | |
| Peeling resistance gf/cm | 700 | 630 | 650 | 750 | cut | cut | 600 |
| Shearing force | 15.6 | 15.5 | 12.8 | 13.4 | 15.3 | 11.4 | 13.2 |

TABLE 2-continued

| | Characteristics of adhesive tape | | | | | | |
|---|---|---|---|---|---|---|---|
| | Example 1 | Example 2 | Example 3 | Example 4 | Comparative example 1 | Comparative example 2 | Comparative example 3 |
| kgf/cm$^2$ Adhesive force to glass plate | | | | | | | |
| Peeling resistance gf/cm | 850 | 640 | 680 | 800 | cut | cut | 620 |
| Shearing force kgf/cm$^2$ | 13.4 | 11.1 | 10.5 | 12.3 | 12.5 | 3.5 | 10.9 |

TABLE 3

| | Application tests of adhesive tape | | | | | | |
|---|---|---|---|---|---|---|---|
| | Example 1 | Example 2 | Example 3 | Example 4 | Comparative example 1 | Comparative example 2 | Comparative example 3 |
| Cutting of backing after banding[3] | | | | | | | |
| Long side | absent | absent | absent | absent | present | absent | present |
| Corner | absent | absent | absent | absent | present | present | present |
| Short side | absent | absent | absent | absent | present | present | absent |
| Appearance of front of CRT after banding[4] | Peripheral whiskers | Good | Good | Good | Peripheral fuzzy appearance | Corner fuzzy appearance | Peripheral fuzzy appearance |
| Displacement of band after heat cycles (mm)[5] | 0 | 0 | 0 | 0 | 1 | 2 | 0 |
| Displacement of band after acceleration test (mm)[6] | 1 | 0.5 | 0.5 | 0.5 | 5 | 3 | 0.5 |
| Number of cracks under band after 5 feet pound test[7] | 6 | 6 | 5 | 5 | 15 | 20 | 15 |
| Glass capture rate after CRT fall test[8] | 93 | 94 | 93 | 93 | 91 | 90 | 85 |

The followings are foot notes for Tables 2 to 3.

1) Observation of the side of the adhesive tape (45 mm wide and 300 m long) by eye.

2) A steel wire with a diameter of 0.5 mm is applied on the pressure sensitive adhesive layer of the tape, a pressure of 20 kgf/m$^2$ is applied to the tape and wire for 10 seconds, and the tensile strength of the tape in the transverse direction is measured.

3) Observed by eye after cutting the band.

4) A CRT with a clamped band is set in a TV cabinet and placed in a black room, the CRT is illuminated with a 50 W incandescent lamp from the rear side, and the front side of the CRT is observed by eye.

5) After 10 heat cycles in which one heat cycle includes −45° C. for 5 hours and +80° C. for 5 hours, the maximum displacement of the band on the CRT is measured.

6) A CRT is held, in an atmosphere of 70° C. with the front surface of the CRT upward, by the band, a 120 kg weight is mounted on the front surface of the CRT for 30 minutes, and the maximum displacement of the band on the CRT is measured.

7) A 1 pound steel ball is dropped onto the front surface of the CRT (held horizontally) from a height of 5 feet.

8) A CRT with the front surface held downward is dropped from a height of 1.5 m and the glass capture or adhering rate (in surface area percent) of the band, in relation to the entire band inner surface area, is measured.

In Tables 1 to 3, it is seen that when spun rayon yarns or glass filament yarns were used as the warps and wefts (Comparative examples 1 to 3), the compression rupture strength was insufficient and the results of the application tests of the adhesive tape were inferior. The reasons why the glass cloth backing does not substantially improve the characteristics and application tests are thought to be the lack of flexibility and lack of conformability to the curved shape of a CRT. In contrast, when spun rayon yarns were used as the warps and glass filament yarns were used as the wefts (Examples 1 to 4), the characteristics of the adhesive tape including the compression rupture strength and the application test performances were significantly improved. These improvements are considered to be derived from the combination of the high mechanical strengthes of the glass filament yarns as the wefts and the flexibility of the spun rayon yarns as the warps. Furthermore, when black spun rayon yarns were used as the warps in combination with the glass filament yarns as at least part of the wefts (Examples 2 to 4), the whiteness of protruding fibers of the broken warp yarns along the periphery of the adhesive tape disappeared, and the light leakage through the adhesive tape and the resultant whiteness or fuzziness at the peripheral portion of a CRT display surface were not observed.

We claim:

1. An adhesive tape for preventing implosion of a cathode ray tube, comprising:

a backing having first and second main surfaces, a pressure sensitive adhesive layer disposed on said first main surface of the backing, and a hot melt adhesive layer disposed on said second main surface of the backing, said backing being a union cloth including natural or synthetic organic fiber yarns as the warps and, as the wefts, a combination of glass filament yarns and natural or synthetic organic fiber yarns, wherein in the wefts there are one to thirty yarns of said natural or synthetic organic fiber yarns arranged between each of the glass filament yarns and the glass filament yarn on each side of said each glass filament yarn, said adhesive tape having a transverse compression rupture strength of at least 5 kgf/cm, all of said natural or synthetic organic fiber yarns have a yarn counting of 10 S to 40 S, wherein S represents gram weight per one hundred meter length, a density of said warp yarns is 10 to 30 per 25 mm and a density of said weft yarns is 10 to 25 per 25 mm, and all of said natural or synthetic organic fiber yarns are black.

2. An adhesive tape according to claim 1 wherein said warps are black colored fiber yarns, and said adhesive tape looks black when viewed from the sides of said adhesive tape.

3. An adhesive tape according to claim 2, wherein said weft glass filament yarns have a thickness of 25 d to 500 d.

4. An adhesive tape according to claim 3, wherein said warp and/or weft natural or synthetic fiber yarns have a yarn counting of 20 S to 30 S and said weft glass filament yarn have a thickness of 50 d to 200 d.

5. An adhesive tape according to claim 1 wherein said glass filament yarns are used in a ratio of up to three natural or synthetic organic fiber yarns per one glass filament yarn, in said wefts.

6. An adhesive tape according to claim 2, wherein said hot melt adhesive layer is made of a resin selected from the group consisting of polyethylene, polyester, acryl-grafted polyethylene, ethylene-vinyl acetate copolymer, stylene butadiene copolymer, ethylene acryl copolymer and polyamide resins and mixtures thereof.

7. A process for reinforcing a cathode ray tube to prevent an implosion thereof, said process comprising:

preparing a cathode ray tube having a maximum peripheral portion and covered with a transparent electrically conductive film;

winding an adhesive tape according to claim 1 completely or partly on or near the portion of the maximum peripheral portion of the cathode ray tube; and clamping the cathode ray tube with a metal clamping band around the maximum peripheral portion of the tube and on top of the adhesive tape, by heating the metal clamping band to a temperature of not less than 60° C. and placing the metal clamping band around the adhesion tape, cooling the metal clamping band to fix the adhesive tape to the maximum peripheral portion of the tube by the metal clamping band.

8. An adhesive tape for preventing implosion of a cathode ray tube, comprising:

a backing having first and second main surfaces, a pressure sensitive adhesive layer disposed on said first main surface of the backing, a hot melt adhesive layer disposed on said second main surface of the backing, said backing being a union cloth including natural or synthetic organic fiber yarns as the warps and, as the wefts, glass filament yarns, said adhesive tape having a transverse compression rupture strength of at least 5 kgf/cm, wherein said natural or synthetic organic fiber yarns consist of fibers selected from the group consisting of cotton, rayon, acrylic, and polyester fibers, and said warps do not include glass fibers.

9. An adhesive tape for preventing implosion of a cathode ray tube, comprising:

a backing having first and second main surfaces, a pressure sensitive adhesive layer disposed on said first main surface of the backing;

a hot melt adhesive layer disposed on said second main surface of the backing, said backing being a union cloth including natural or synthetic organic fiber yarns as the warps and, as the wefts, glass filament yarns, said adhesive tape having a transverse compression rupture strength of at least 5 kgf/cm, wherein said warps do not include glass fibers.

* * * * *